Jan. 16, 1962   J. T. RICHARDSON   3,017,256
CONTROL OF CATALYTIC CONVERSION OF HYDROCARBONS
Filed July 22, 1959
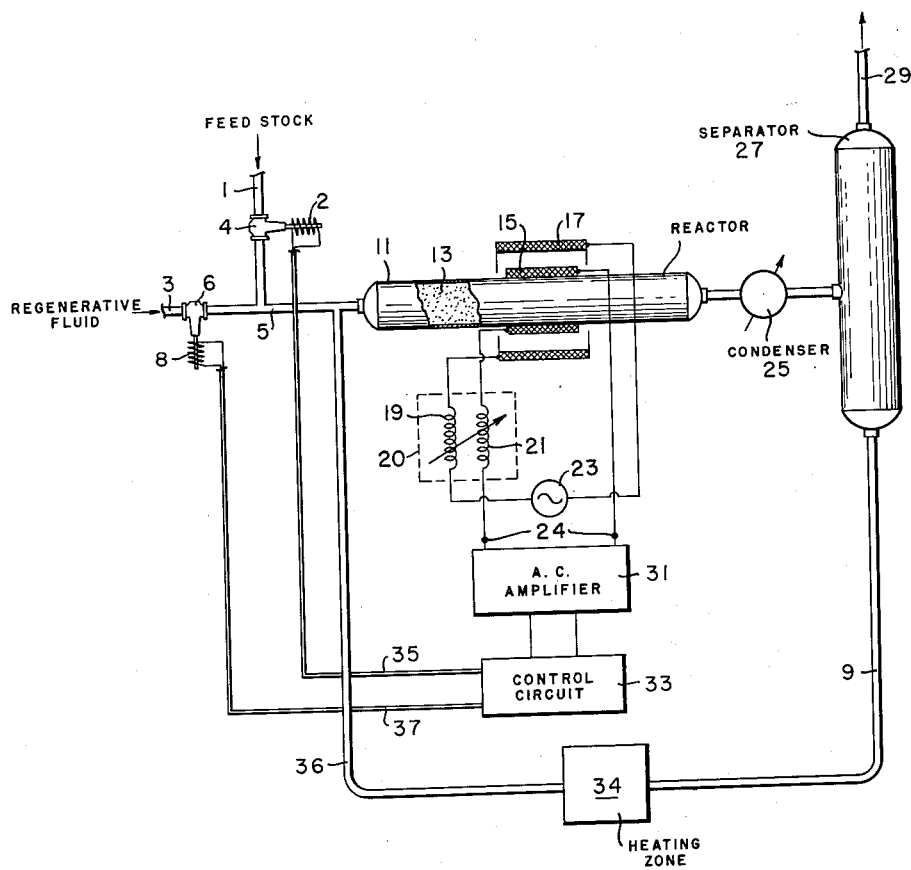
INVENTOR.
JAMES T. RICHARDSON,
BY John B. Davidson
ATTORNEY.

United States Patent Office  
3,017,256  
Patented Jan. 16, 1962

3,017,256
CONTROL OF CATALYTIC CONVERSION OF HYDROCARBONS
James T. Richardson, Baytown, Tex., assignor, by mesne assignments, to Esso Research and Engineering Company, Elizabeth, N.J., a corporation of Delaware
Filed July 22, 1959, Ser. No. 828,815
7 Claims. (Cl. 23—288)

This invention is directed to the chemical conversion of hydrocarbons in the presence of subdivided solid (or particle form) catalytic material. More particularly, the invention is directed to the automatic control of the catalytic state of subdivided solid catalyst.

In co-pending U.S. patent application Serial No. 714,097, filed on February 10, 1958, by James A. Dinwiddie for "Catalytic Process," there is described a method for the catalytic chemical conversion of a fluent feed material wherein a fluent carrier is continuously, unidirectionally flowed through at least a segment of an elongate bed of finely-divided, solid conversion catalyst under treating temperature and pressure conditions. Pulses of fluent feed stock are periodically introduced into the carrier so that continuous fractionation of at least a portion of the components of the ensuing reaction will occur. The catalyst may be a finely-divided dehydrogenation catalyst such as ferric oxide, supported on a high surface area carrier such as alumina.

As the catalytic chemical conversion progresses in time, the catalytic activity of the catalyst tends to diminish, and the efficiency of the reaction is considerably lessened. In due course it is necessary to rejuvenate the catalyst in order for the reaction to proceed further.

In accordance with the teachings of the present invention, there is used a catalyst that varies in magnetic permeability as it reacts with a fluent feed material. The magnetic permeability of the catalyst is electromagnetically monitored by including at least a portion of the catalyst in the magnetic circuit of a transformer, and detecting the changes in the output voltage of the transformer effected by changes in the magnetic permeability of the catalyst. As the catalyst reacts with a fluent feed material that is flowed therethrough, its catalytic activity will gradually decrease, and its magnetic permeability will change. The variations in output voltage of the transformer are utilized to control the flow of feed stock and rejuvenating fluid through the catalyst.

The invention will be further described with reference to the accompanying drawing, the single figure of which schematically illustrates one manner in which the invention may be practiced.

In the figure there is shown an elongated, cylindrical reaction zone 11 within which is packed a particulate catalyst 13. In the embodiment shown in drawing, the cylindrical member 11 must be of nonmagnetic material for reasons that will become apparent in the light of the following description of the invention.

For the purpose of detecting the magnetic state of the catalyst, an electrical transformer is provided that includes a primary winding 17 and a secondary winding 15 wound around the central portion of the cylindrical shell 11 so that the path of the magnetic flux that is mutual to the windings passes through the portion of catalyst bed 13 encompassed by the windings. The relative size of the windings and the cylindrical shell 11 shown in the figure are not necessarily realistic, but are as shown in the drawing only for the purpose of illustration.

The catalyst included within the cylindrical member 11 may be selected from the following: iron, cobalt, or nickel, or their oxides or sulfides, supported on suitable inert supports. A particularly suitable dehydrogenation catalyst for use in connection with the present invention is $NiO$—$Al_2O_3$. The specific magnetization of this catalyst in a field of 100 oersteds may vary between 0.0012 E.M.U. and 13.0 E.M.U. when converted from its most catalytic state to its least catalytic state.

Feed stock is injected into the reactor from line 1, through electromagnetically actuated valve 4 and line 5. The feed stock may or may not be mixed with a suitable inert carrier gas, as desired. Fluent material issuing from the reactor passes through a condenser 25 into a suitable separating zone 27, wherein the gaseous hydrocarbon components thereof are separated from the condensed liquid components. The gaseous components may be discharged from zone 27 by way of a line 29 leading to a fractionation zone of any suitable construction (not shown) for separation and recovery of the reaction components. The condensed liquids are continuously withdrawn from the zone 27 by way of a line 9 leading to a heating zone 34 wherein the liquids are volatilized and injected through line 36 into line 5.

Rejuvenating or regenerating fluid from line 3 is injected into the reaction zone through electromagnetically actuated valve 6 and line 5. The rejuvenating fluid may be oxygen, air, or steam. A particularly suitable regenerating fluid for the preferred catalyst designated above is air.

An alternating current source 23 is electrically connected to primary winding 17 through the primary winding 19 of an adjustable transformer 20. The secondary winding 21 of transformer 20 is connected in series with the secondary winding 15 so that the sum voltage of the voltages across the two transformer secondary windings appears across the input terminals 24 of alternating current amplifier 31. The voltage appearing across secondary winding 21 may be varied by adjusting the mutual inductance of windings 19 and 21. The output signal from the alternating current amplifier 31 is coupled to a control circuit 33. Control circuit 33 may have two output circuits; one circuit is coupled to valve winding 2 by means of cable 35, and the other circuit is coupled to valve winding 8 by means of cable 37. The function of the control circuit 33 is to selectively energize and deenergize windings 2 and 8 to actuate valves 4 and 6, respectively, responsive to attainment of preselected amplitudes in the voltage appearing across terminals 24 of amplifier 31 for the ultimate purpose of gating the flow of feed stock and regenerating fluid in alternation through the reaction zone 11. Depending upon the design of the control circuit 33, it is possible to eliminate the amplifier 31 or to incorporate the amplifier in control circuit 33. A suitable apparatus for use as control circuit 33 is manufactured by Daytronic Corporation, Model No. 302.

In operation, let it be assumed that valve 4 is normally open, that valve 6 is normally closed, and that the catalyst 13 is in its most catalytic condition. Transformer 20 will be adjusted so that the sum of the voltages appearing across windings 21 and 15 will be of a given amplitude $S_1$. For example, the transformer may be adjusted so that the voltage across winding 21 is of the same amplitude as the voltage across winding 15 and of opposite phase relative thereto. Under this condition there will be zero voltage across terminals 24. In the activated or most catalytic condition of the catalyst, the catalyst will be in its least ferromagnetic state so that voltage across winding 15 will have a relatively low amplitude. Feed stock flowing through the reactor may be in pulses and intermixed with a carrier gas, as described in Dinwiddie application Serial No. 714,097, or may be continuous, as described in U.S. Patent No. 2,603,591—Evans. In either circumstance, the catalytic activity of the catalyst gradually will diminish and the permeability of the catalyst will increase as the feed stock flows therethrough. The amplitude of the voltage appearing across winding 15 will gradually increase, and the sum voltage appearing across terminals 24 will change to a second value $S_2$. When the voltage across terminals 24 reaches the value $S_2$, control circuit 33 actuates valves 4 and 6 to close valve 4 and open valve 6. Flow of feed stock through the reactor is cut off and the flow of regenerating fluid through the reactor is begun for the purpose of rejuvenating the catalyst particles. As the catalyst particles react with the regenerating fluid, the permeability of the catalyst increases. Eventually the signal appearing across terminals 24 reaches the initial amplitude $S_1$. When the voltage across terminals 24 reaches amplitude $S_1$, the control circuit 33 is again triggered to produce signals on cables 35 and 37 that will close valve 6 and open valve 4. The flow of regenerating fluid will stop, and feed stock again will flow through the catalyst. The alternate flow of feed stock and regenerating fluid thus may be controlled indefinitely.

Manifestly, the design of the valve 4 and 6 and the actuating mechanisms therefor may vary. Both valves 4 and 6 may be opened only when windings 2 and 8, respectively, are energized; in this case it will be necessary for an output signal to appear on cable 35 in order to permit the flow of feed stock into the reactor. Likewise, the valves may be designed so that either or both of the valves may be closed rather than opened by energization of windings 2 and 8, in which case windings 2 and 8 will be energized by control circuit 33 only when it is desired to permit the flow of fluid through the particular valve associated therewith.

The windings 15 and 17 need not be wound on the outside of the cylindrical reactor shell as shown. The windings may be disposed within the reactor so as to be in magnetic relationship with each other and with a representative portion of the catalyst. The portion of the catalyst with which the windings are in magnetic relationship should be positioned within the reactor in a location such that the magnetic state of that portion is truly representative of the average magnetic state of the catalyst as a whole.

Under certain circumstances, when the pulsing method described in the aforecited Dinwiddie application is utilized, the regenerating fluid and the carrier fluid for the feed stock may be one and the same. Under this circumstance, the valve 6 and the control circuitry therefor may be eliminated. Catalysts that may be used in a system of this nature are $NiO$—$Al_2O_3$, $Fe_2O_3$—$Al_2O_3$, and $CoO$—$Al_2O_3$, and the carrier and regenerating fluid will be helium or steam.

The invention is not necessarily to be restricted to the specific structural details, arrangement of parts, and circuit connections herein set forth, as various modifications thereof may be effected without departing from the spirit and scope of the invention.

What is claimed is:

1. In a system for fluent phase catalytic chemical conversion of a fluent hydrocarbonaceous feed material unidirectionally flowed through a conversion zone under conversion conditions in the presence of a finely divided, chemically active, solid catalyst having a ferromagnetic characteristic variable with its catalytic activity; first means connected to the conversion zone for controlling the flow of feed material into the conversion zone; a source of regenerating fluid adapted to restore the catalyst to catalytic activity after reaction of the feed material with the catalyst; second means connecting said source to the conversion zone for controlling the flow of regenerating fluid into the conversion zone; electrical means electromagnetically associated with the catalyst for detecting the magnetic state thereof and for producing an output signal having a first amplitude when the catalyst has a magnetic state indicative of a given catalytic activity, and a second amplitude when the catalyst has a magnetic state indicative of a given lessened catalytic activity; and control means connected to said electrical means and to said first and second means for selectively actuating said first and second means responsive to variation in said output signal so that said first means permits flow of feed material into the conversion zone when said signal is of said first amplitude and stops flow of feed material when said signal reaches said second amplitude, and so that said second means permits flow of regenerating fluid when said signal is of said second amplitude and stops the flow of regenerating fluid when said signal reaches said first amplitude.

2. In a system for fluent phase catalytic chemical conversion of a fluent hydrocarbonaceous feed material unidirectionally flowed through a conversion zone under conversion conditions in the presence of a finely divided, chemically active, solid catalyst having a ferromagnetic characteristic variable with its catalytic activity; first means for controlling the flow of feed material into the conversion zone; a source of regenerating fluid adapted to restore the catalyst to catalytic activity after reaction of the feed material with the catalyst; second means connecting said source to the conversion zone for controlling the flow of regenerating fluid into the conversion zone; electrical means electromagnetically associated with the catalyst for detecting the magnetic state thereof and for producing an output signal having a first amplitude when the catalyst has a magnetic state indicative of a given catalytic activity, and a second amplitude when the catalyst has a magnetic state indicative of a given lessened catalytic activity; and control means connected to said electrical means and to said first and second means, responsive to attainment by said output signal of said first amplitude to actuate said first means to permit flow of feed material into the conversion zone until said signal is of said second amplitude, and responsive to attainment of said second amplitude by said output signal to actuate said second means to permit flow of regenerating fluid into said conversion zone until said signal attains said first amplitude.

3. In a system for fluent phase catalytic chemical conversion of a fluent hydrocarbonaceous feed material unidirectionally flowed through a conversion zone under conversion conditions in the presence of a finely divided, chemically active, solid catalyst having a ferromagnetic characteristic variable with its catalytic activity; first means for controlling the flow of feed material into the conversion zone; a source of regenerating fluid adapted to restore the catalyst to catalytic activity after reaction of the feed material with the catalyst; second means connecting said source to the conversion zone for controlling the flow of regenerating fluid into the conversion zone; an electrical transformer comprising primary and secondary winding means magnetically coupled to at least a portion of the catalyst so that mutual lines of magnetic flux therefor link the catalyst, and so that the voltage induced in said secondary winding varies between a first amplitude and a second amplitude in accordance with the ferromagnetic characteristic of the catalyst; an alternating current source coupled to said primary winding; control circuit means having an input circuit coupled to said secondary winding, and having output circuit means connected to said first and second means for control thereof, said control circuit means being responsive to attainment of said first amplitude by said voltage induced into said secondary winding to actuate said first means to permit flow of said feed material into the conversion zone until said voltage is of said second amplitude, and responsive to attainment of said second amplitude by said voltage to actuate said second means to permit flow of regenerating fluid into the conversion zone until said voltage is of said first amplitude.

4. In a system for the catalytic dehydrogenation of a volatilized hydrocarbon feed stock unidirectionally flowed through a conversion zone under conversion conditions in the presence of a finely divided, ferromagnetic, dehydrogenation catalyst having a magnetic permeability variable as an inverse function of the catalytic activity thereof; first electromagnetically controlled valve means having an actuating winding, connected to said conversion zone for controlling the flow of the hydrocarbon feed stock through the catalyst, said valve means being adapted to open to permit the flow of said hydrocarbon feed stock into the conversion zone when said winding is energized, and to close when said winding is deenergized to stop the flow of hydrocarbon feed stock into the conversion zone; second electromagnetically controlled valve means having an actuating winding, connected to said conversion zone for controlling the flow of a regenerated fluid through the catalyst, said second valve means being adapted to open responsive to energization of said actuating winding thereof to permit the flow of the regenerating fluid through the catalyst, and responsive to de-energization of the actuating winding to stop the flow of regenerating fluid through the catalyst; a transformer comprising a primary winding and a secondary winding magnetically coupled to the catalyst so that the voltage induced in said secondary winding responsive to energization of said primary winding varies as an inverse function of the magnetic permeability of the catalyst; and control means coupled to said secondary winding and to said control winding of said first and second valve means adapted to energize the control winding of said first valve means and de-energize the control winding of said second valve means when the output voltage across said secondary winding increases to a first given amplitude, and to de-energize the control winding of said first valve means and energize the control winding of said second valve means when the output voltage across said secondary winding decreases to a second given amplitude less than said first given amplitude.

5. In a system for fluent phase catalytic chemical conversion of a fluent hydrocarbonaceous feed material unidirectionally flowed through a conversion zone under conversion conditions in the presence of a finely divided, chemically active, solid catalyst having a ferro-magnetic characteristic variable with its catalytic activity, wherein first means connected to the conversion zone selectively controls the flow into the conversion zone of feed material and a regenerating fluid adapted to restore the catalyst to catalytic activity after reaction of the feed material with the catalyst, the improvement comprising: electrical means electromagnetically associated with the catalyst for detecting the magnetic state thereof and for producing an output signal having a first amplitude when the catalyst has a magnetic state indicative of a given catalytic activity, and a second amplitude when the catalyst has a magnetic state indicative of a given lessened catalytic activity; and control means connected to said electrical means and to said first means for selectively actuating said first means responsive to variation in said output signal to initiate flow of regenerating fluid into said conversion zone when said signal is of said second amplitude and to stop flow of regenerating fluid into said conversion zone when said signal is of said first amplitude.

6. In a system for fluent phase catalytic chemical conversion of a fluent hydrocarbonaceous feed material unidirectionally flowed through a conversion zone under conversion conditions in the presence of a finely divided, chemically active, solid catalyst having a ferror-magnetic characteristic variable with its catalytic activity, wherein first means connected to the conversion zone selectively controls the flow into the conversion zone of feed material and a regenerating fluid adapted to restore the catalyst to catalytic activity after reaction of the feed material with the catalyst, the improvement comprising: electrical means electromagnetically associated with the catalyst for detecting the magnetic state thereof and for producing an output signal having a first amplitude when the catalyst has a magnetic state indicative of a given catalytic activity, and a second amplitude when the catalyst has a magnetic state indicative of a given lessened catalytic activity; and control means connected to said electrical means and to said first means for selectively actuating said first means responsive to variation in said output signal to initiate flow of feed material into the conversion zone when said signal is of said first amplitude and to stop flow of feed material into said conversion zone when said signal is of said second amplitude, and to initiate flow of regenerating fluid into said conversion zone when said signal is of said second amplitude and to stop flow of generating fluid into said conversion zone when said signal is of said first amplitude.

7. In a system for fluent phase catalytic chemical conversion of a fluent hydrocarbonaceous feed material unidirectionally flowed through a conversion zone under conversion conditions in the presence of a finely divided, chemically active, solid catalyst having a ferro-magnetic characteristic variable with its catalytic activity, wherein first means connected to the conversion zone selectively controls the flow into the conversion zone of feed material and a regenerating fluid adapted to restore the catalyst to catalytic activity after reaction of the feed material with the catalyst, the improvement comprising: an electrical transformer comprising primary and secondary winding means magnetically coupled to at least a portion of the catalyst so that mutual lines of magnetic flux link the catalyst, and so that the voltage induced in said secondary winding varies between a first amplitude and a second amplitude in accordance with the ferromagnetic characteristic of the catalyst; an alternating current source coupled to said primary winding; and control circuit means having an input circuit coupled to said secondary winding and having an output circuit connected to said first means for control thereof, said control circuit means being responsive to attainment of said second amplitude by said voltage induced into said secondary winding to actuate said first means to permit flow of regenerating fluid into the conversion zone until said voltage is of said first amplitude, and responsive to attainment of said first amplitude by said voltage to actuate said first means to prevent flow of regenerating fluid into the conversion zone until said zone is of said second amplitude.

References Cited in the file of this patent
UNITED STATES PATENTS

| | | |
|---|---|---|
| 2,494,628 | Oberoling | Jan. 17, 1950 |
| 2,765,330 | Kirschenbaum | Oct. 2, 1956 |